United States Patent [19]
Graziani

[11] 3,802,330
[45] Apr. 9, 1974

[54] SERVING DISH
[76] Inventor: Amerigo A. Graziani, 1201 S.W. 12th Ct., Miama, Fla. 33135
[22] Filed: Jan. 17, 1973
[21] Appl. No.: 324,337

[52] U.S. Cl............... 99/419, 99/421 H, 126/25 R
[51] Int. Cl. ............................................. A47j 37/04
[58] Field of Search ............ 99/419, 420, 421, 339; 17/1 S; 126/25 R; 269/289, 290, 309

[56] References Cited
UNITED STATES PATENTS
102,348   4/1870   Willard ................................ 99/419
1,527,766   2/1925   Wellman et al. ................ 99/419 UX
2,521,220   9/1950   Huntington ........................... 99/419
2,885,951   5/1959   Wolske ....................... 99/421 H X Primary Examiner—Robert W. Jenkins
Assistant Examiner—Arthur O. Henderson

[57] ABSTRACT

A serving dish having a disc shaped non-heat conductive plate with upstanding spaced skewer supports and a dish shaped member arranged beneath a skewer spanning the skewer supports and into which a heat producing material is adapted to be received to provide heat to keep food on the skewer warm.

5 Claims, 3 Drawing Figures

PATENTED APR 9 1974 3,802,330
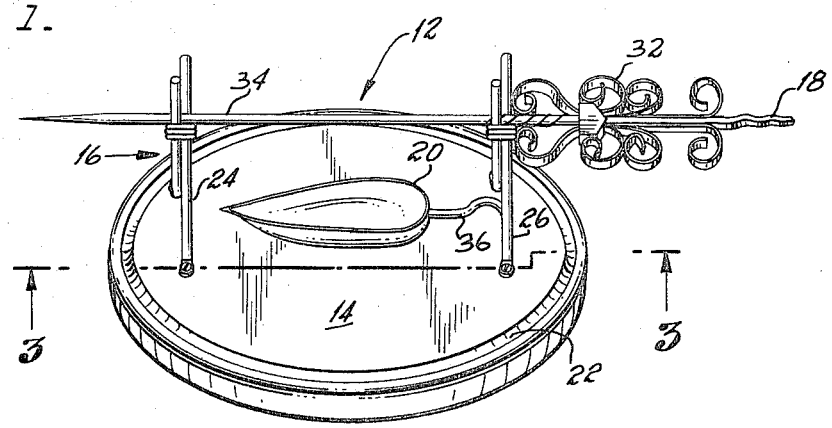
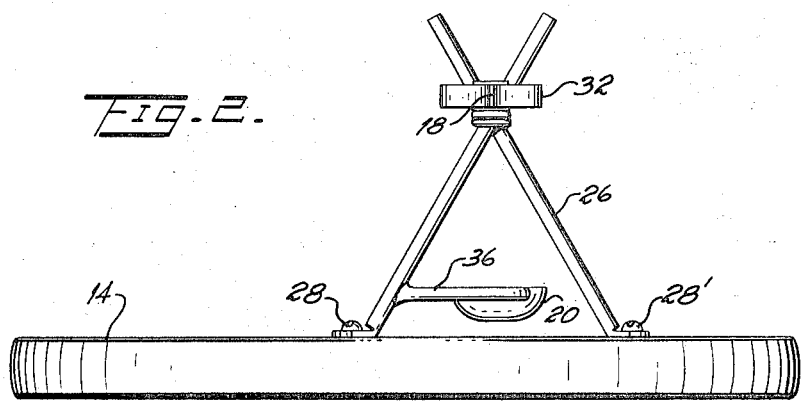
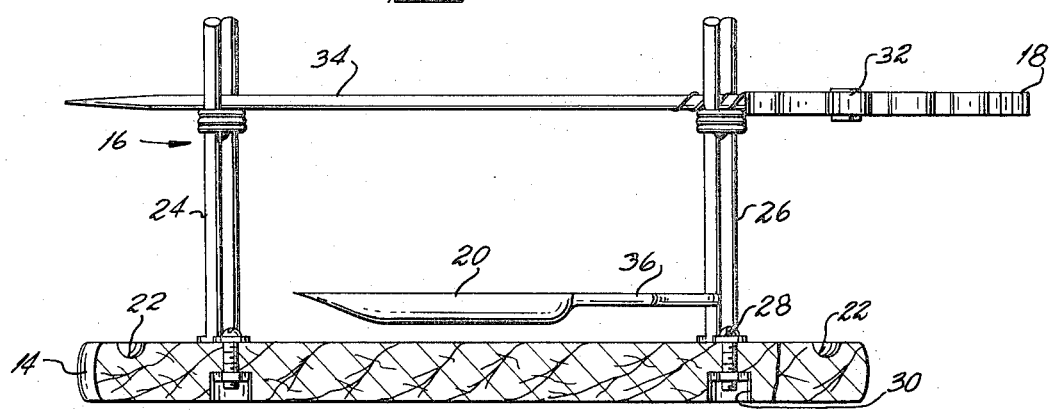

SERVING DISH

FIELD OF THE INVENTION

This invention relates to serving dishes and more particularly to a serving dish having a skewer support and heat producing means to keep food warm while it is being served and prior to its being eaten.

BACKGROUND OF THE INVENTION

In the past it is known that to provide food on a skewer presents an attractive means for serving it. This invention provides a serving dish which includes a skewer support means arranged on it and a skewer spanning the skewer support means and above a dish shaped member supported by the skewer support means which contains heat producing material which may be kindled to keep the food material on the skewer warm while it is served and prior to being eaten.

OBJECTS OF THE INVENTION

This invention has as an object the provision of a serving dish which is provided with a) skewer support means and b) a skewer arranged above a dish which is supported on the skewer support means above the main support surface of the dish and into which kindled material can be provided to heat food on the skewer to keep it warm during serving.

In accordance with the foregoing object and others which will become apparent from the instant invention now to be described, reference will now be made to the accompanying drawing in which:

DESCRIPTION OF THE DRAWINGS

FIG. 1 is a perspective view of the serving dish of the instant invention;

FIG. 2 is a side elevation view of the serving dish of FIG. 1; and

FIG. 3 is a view in cross section taken on the plane indicated by the line 3—3 of FIG. 1 and looking in the direction of the arrows.

DETAILED DESCRIPTION OF THE PREFERRED EMBODIMENT

Referring to the drawings wherein like reference characters designate like or corresponding parts throughout the several views of the drawing, and referring particularly to FIG. 1, in which the serving dish is generally designated by the numeral 12, it is seen to comprise a disc shaped plate 14, a skewer stand 16 and a skewer 18, with the skewer stand including a dish shaped member 20 intended to and adapted to receive a charge of kindled material, such as charcoal, or the conventionally available inflammable material known commercially as Sterno.

The plate 14 is preferably of non-conductive material, such as wood, and is generally disc shaped having a main top surface and bottom surface with the top surface being provided with a continuous channel 22 adjacent the periphery of the plate.

The skewer stand comprises a first and a second X-shaped skewer support member 24 and 26 which are arranged in spaced upstanding relation to the plate and with respect to the top surface thereof, each skewer support means having a lower support portion which is anchored to the plate, preferably by screws 28 and 28', see FIG. 2, which extend through and connect with a bolt which is recessed in the bottom surface of the plate as at 30.

The skewer includes a conventional handle portion 32 and a spear portion 34, the spear portion being of a length to span the distance between the support surfaces on the skewer stand and the spear portion being of a length such that its weight is at least slightly greater than that of the handle portion so as not to readily tip when in the attitude shown in FIG. 1 and to be securely supported by the skewer stand when a column of meat or other food items are arranged on it in the length between the skewer support stand members.

As seen in FIG. 1, the disc shaped member 20 is connected to one of the support members of the skewer stand by a curved rod-type portion 36.

In use, after food has been arranged on the skewer, a charge of flammable material is placed in the well of the disc shaped member, which is preferably in the shape shown, mainly for artistic reasons, whereby heat from it will heat food on the skewer when it is supported as shown in FIG. 1 on the skewer stand.

In this manner, the serving dish can be used repeatedly to provide hot food in busy restaurants and a supply may be arranged in advance and kept warm to be picked up as orders are placed for the skewered food.

What is claimed is:
1. A serving dish comprising:
   a generally disc shaped plate having a main top surface and bottom surface and with a continuous channel in the top surface adjacent the periphery of the plate;
   a skewer stand comprising,
   a first and a second skewer support means,
   means mounting the first and second skewer support means in spaced upstanding relation of the plate and with respect to the top surface,
   each skewer support means having a skewer support portion;
   a skewer comprising a handle portion and a spear portion, the spear portion having a length to span the distance between the support surfaces and being of a weight at least slightly greater than that of the handle portion;
   said skewer stand including a dish shaped member beneath the skewer support surfaces and between the first and second skewer stand above the main top surface for holding a heat producing means to provide heat to material on the spear portion of the skewer.
2. The serving dish as set forth in claim 1 wherein each of said skewer support means comprises a generally X-shaped member and said skewer support surfaces comprise the upwardly facing crotch portion of the support members.
3. The serving dish as set forth in claim 2 wherein the lower bifurcated ends of the members are provided with feet and means attaching the feet to the upper surface of the plate.
4. The serving dish as set forth in claim 1 wherein the area on the main surface between the means connecting the support members is substantially on one side of a line dividing the top surface into two substantially equal portions.
5. The serving dish as set forth in claim 1 wherein said dish shaped member includes a laterally extending stem portion connected to one of said support members.

* * * * *